US012811921B2

(12) United States Patent
El Soussi et al.

(10) Patent No.: US 12,811,921 B2
(45) Date of Patent: Nov. 24, 2026

(54) SYSTEM AND METHOD FOR PERFORMING SECURE KEY EXCHANGE

(71) Applicants: Stichting IMEC Nederland, Eindhoven (NL); Katholieke Universiteit Leuven, KU LEUVEN R&D, Leuven (BE)

(72) Inventors: Mohieddine El Soussi, Turnhout (BE); Abuding Aishajiang, Leuven (BE)

(73) Assignees: Stichting IMEC Nederland, Eindhoven (NL); Katholieke Universiteit Leuven, KU LEUVEN R&D, Leuven (BE)

( * ) Notice: Subject to any disclaimer, the term of this patent is extended or adjusted under 35 U.S.C. 154(b) by 0 days.

(21) Appl. No.: 18/970,204

(22) Filed: Dec. 5, 2024

(65) Prior Publication Data

US 2025/0097203 A1 Mar. 20, 2025

Related U.S. Application Data

(63) Continuation of application No. 17/842,440, filed on Jun. 16, 2022, now Pat. No. 12,199,955.

(30) Foreign Application Priority Data

Jun. 18, 2021 (EP) .................................... 21180200

(51) Int. Cl.
*H04L 9/40* (2022.01)

(52) U.S. Cl.
CPC ........ *H04L 63/0428* (2013.01); *H04L 63/065* (2013.01)

(58) Field of Classification Search
CPC .......................... H04L 63/0428; H04L 63/065
(Continued)

(56) References Cited

U.S. PATENT DOCUMENTS 5,003,593 A * 3/1991 Mihm, Jr. ............ H04L 9/0833 380/282
7,234,058 B1 6/2007 Baugher et al.
(Continued)

FOREIGN PATENT DOCUMENTS

WO 2015/184385 A1 12/2015

OTHER PUBLICATIONS

European Patent Office; Extended European Search Report and Written Opinion, Application No. EP21180200.4, mailed Nov. 17, 2021, 8 pages.

(Continued)

*Primary Examiner* — Michael S McNally
(74) *Attorney, Agent, or Firm* — McDonnell Boehnen Hulbert & Berghoff LLP

(57) ABSTRACT

A system is provided for performing secure key exchange between a plurality of nodes of a communication network. The system comprises a master node and at least two slave nodes. In this context, the master node is configured to authenticate the at least two slave nodes with a pair-wise authentication key corresponding to each pair of master node and slave nodes. The master node is further configured to generate a group authentication key common to the plurality of nodes. Furthermore, the master node is configured to encrypt the group authentication key with the pair-wise authentication key for each respective pair of master node and slave nodes, thereby generating a respective encrypted group authentication key. Moreover, the master node is configured to communicate the encrypted group authentication key to the respective slave nodes.

20 Claims, 8 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 2008/0016350 | A1 | 1/2008 | Braskich et al. | |
| 2008/0075280 | A1 | 3/2008 | Ye et al. | |
| 2009/0103730 | A1 * | 4/2009 | Ward | G06Q 20/02 380/258 |
| 2010/0031036 | A1 * | 2/2010 | Chauncey | H04W 12/033 713/168 |
| 2013/0036305 | A1 | 2/2013 | Yadav et al. | |
| 2016/0149908 | A1 * | 5/2016 | Unagami | H04L 63/065 713/170 |
| 2018/0160459 | A1 * | 6/2018 | Cavalcante | H04W 52/0229 |
| 2022/0407845 | A1 | 12/2022 | El Soussi et al. | |

OTHER PUBLICATIONS

Musfiq Rahman and Srinivas Sampalli; "An efficient pairwise and group key management protocol for wireless sensor network." Wireless Personal Communications 84, pp. 2035-2053; Apr. 2, 2015.
Lung-Chung Li, Yao-Pin Tsai, and Ru-Sheng Liu; "A novel ID-based authenticated group key agreement protocol using bilinear pairings;" 2008 5th IFIP International Conference on Wireless and Optical Communications Networks (WOCN'08), pp. 1-5. IEEE, 2008.
Shogo Ochiai, Keiichi Iwamura, and Ahmad Akmal Aminuddin Mohd Kamal; "Secure pairwise key sharing using geometric group key sharing method (full paper);" Cryptology ePrint Archive (2019).
Elaine Barker, Lily Chen, Allen Roginsky, and Miles Smid. Recommendation for pair-wise key establishment schemes using discrete logarithm cryptography. NIST Special Publication (SP) 800-56A Rev. 2. National Institute of Standards and Technology, U.S. Department of Commerce, May 2013, 138 pages (two parts).
Sencun Zhu, Sanjeev Setia, and Sushil Jajodia; "Leap+ Efficient security mechanisms for large-scale distributed sensor networks." ACM Transactions on Sensor Networks (TOSN) 2, No. 4 (2006): 500-528.
Abdalkahik W. Hussain, and Mahmood K. Ibrahem; "An efficient pairwise and group key management scheme for wireless sensor network;" International Journal of Enhanced Research in Science Technology & Engineering, vol. 4, Issue 1, Jan. 2015; pp. 25-31.
Lein Harn, Chingfang Hsu, and Zhe Xia; "Lightweight group key distribution schemes based on pre-shared pairwise keys;" IET Communications vol. 14, Issue 13, 2020, pp. 2162-2165.
Shan Wu, Chingfang Hsu, Zhe Xia, Jinlong Zhang, and Di Wu; "Symmetric-bivariate-polynomial-based lightweight authenticated group key agreement for industrial internet of things;" Journal of Internet Technology, vol. 21, Issue 7, 2020, pp. 1969-1979.
Sungchul Heo, Zeen Kim, and Kwangjo Kim; "Certificateless authenticated group key agreement protocol for dynamic groups;" IEEE Globecom 2007-IEEE global telecommunications conference, pp. 464-468. IEEE, 2007.
Eun-Jung Lee, Sang-Eon Lee, and Kee-Young Yoo; "A certificateless authenticated group key agreement protocol providing forward secrecy;" International Symposium on Ubiquitous Multimedia Computing, pp. 124-129. IEEE, 2008.
Hugo Krawczyk; "Sigma: The 'SIGn-and-MAc'approach to authenticated Diffie-Hellman and its use in the IKE protocol;" Annual international cryptology conference, pp. 400-425. Springer, Berlin, Heidelberg, Aug. 2003.

* cited by examiner

| Time Slots | 1 | 2 | 3 | ••• | N | N+1 | N+2 | N+3 | ••• | 2N | ••• |
|---|---|---|---|---|---|---|---|---|---|---|---|
| Master | Tx | Rx | Rx | ••• | Rx | Tx | Rx | Rx | ••• | Rx | ••• |
| Slave 1 | Rx | Tx | I | ••• | I | Rx | Tx | I | ••• | I | ••• |
| Slave 2 | Rx | I | Tx | ••• | I | I | I | Tx | ••• | I | ••• |
| | ⋮ | ⋮ | ⋮ | ⋮ | ⋮ | ⋮ | ⋮ | ⋮ | ⋮ | ⋮ | ⋮ |
| Slave N-1 | Rx | I | I | ••• | Tx | I | I | I | ••• | Tx | ••• |

FIG. 4B

SYSTEM AND METHOD FOR PERFORMING SECURE KEY EXCHANGE

CROSS-REFERENCE TO RELATED APPLICATIONS

This application is a continuation application of U.S. patent application Ser. No. 17/842,440, entitled "System and Method for Performing Secure Key Exchange," filed on Jun. 16, 2022, and published as United States Patent Application Publication No. 2022/0407845 A1 on Dec. 22, 2022. U.S. patent application Ser. No. 17/842,440 and United States Patent Application Publication No. 2022/0407845 A1 are incorporated herein by reference.

The present application is a non-provisional patent application claiming priority to European Patent Application No. 21180200.4, filed Jun. 18, 2021, the contents of which are hereby incorporated by reference.

FIELD OF THE DISCLOSURE

This disclosure relates to secure and efficient authentication of multiple devices or nodes of a communication network, e.g., nodes that want to mutually and efficiently evaluate ranging or localization in a secure way, and to exchange group authentication keys and pair-wise authentication keys among the nodes to perform secure communication among the nodes.

BACKGROUND

Nowadays, group communications have become more essential for many emerging applications, especially in wireless networks, e.g. sensor and mobile ad-hoc networks. Due to their open nature, efficient and secure distribution of common key is an essential issue for secure communications in the group. In order to maintain confidentiality during communication in the group, all authorized devices or nodes require a common key called the group key in advance. However, in order to perform secure exchange of authorization keys among the communicating nodes, the system security is required to be further augmented.

For example, the document U.S. Pat. No. 7,234,058 B1 presents a method for generating pairwise cryptographic transforms based on group keys. Particularly, the method derives pair-wise keys for multiple nodes from a group key, which is received from a key server, and further uses the pair-wise keys for point-to-point communication. However, the technique is not secure since a pair-wise key designated to a particular node can be derived by other nodes in the group.

Accordingly, the description describes a system and a method for performing secure key exchange between a plurality of nodes of a communication system, which can address the aforementioned limitations.

The first independent claim includes features of a system and the second independent claim includes features of a method. The dependent claims contain further features.

SUMMARY

According to a first example implementation, a system is provided for performing secure key exchange between a plurality of nodes of a communication network. The system comprises a master node and at least two slave nodes. In this context, the master node is configured to authenticate the at least two slave nodes with a pair-wise authentication key corresponding to each pair of master node and slave nodes. The master node is further configured to generate a group authentication key common to the plurality of nodes. Furthermore, the master node is configured to encrypt the group authentication key with the pair-wise authentication key for each respective pair of master node and slave nodes, thereby generating a respective encrypted group authentication key. Moreover, the master node is configured to communicate the encrypted group authentication key to the respective slave nodes.

Therefore, the communicating nodes are not only provided with a group authentication key for all the nodes in the group but also a pair-wise authentication key for each respective pair of master-slave nodes. The group authentication key is encrypted with the respective pair-wise authentication key, designated to each pair of the master-slave nodes. Hence, the slave nodes do not possess the knowledge of other pair-wise authentication keys except for the one designated to the pair. This facilitates a high degree of security while performing secure communication with a particular node.

In at least some implementations, the master node is configured to communicate with the at least two slave nodes simultaneously. This facilitates efficient authentication of several nodes, e.g. by decreasing the number of transmissions for authentication.

In at least some of those implementations, the at least two slave nodes are configured to receive the respective encrypted group authentication key from the master node sequentially or simultaneously. In addition, each of the at least two slave nodes is configured to decrypt the encrypted group authentication key with its respective pair-wise authentication key. For instance, the master node may transmit the encrypted group authentication key messages sequentially, e.g. in different time slots. Alternately, the master node may transmit the encrypted group authentication key messages simultaneously, e.g. broadcasting one packet containing several messages, i.e. the encrypted group authentication key messages.

Hence, the group authentication key is used to secure the communication between the master node and the plurality of slave nodes. Additionally, the pair-wise authentication key is used to secure the communication between a slave node and the master node. The group authentication key and the pair-wise authentication key are used side-by-side to secure the communication among the nodes.

In at least some implementations, the master node is configured to be operable as a verifier node and the at least two slave nodes each configured to be operable as a verifier node or a prover node. As an example, a verifier node may control access to a resource and a prover node may be used to gain access to the resource controlled by the verifier node, by virtue, at least in part, of physical proximity between the prover node and the verifier node.

Alternatively, the master node and/or the at least two slave nodes are each configured to be operable as a verifier node and a prover node at the same time. Further alternatively, the master node and/or the at least two slave nodes are each configured to be operable as a transient prover node, i.e. an entity that temporarily uses the network in order to localize itself or to gain access to resources for a given duration.

In at least some implementations, the master node and the at least two slave nodes are synchronized (for example, clock-synchronized) with one another. A high transmission accuracy is facilitated among the communicating nodes, especially for networks with variable latency.

In at least some implementations, the master node comprises a transmit mode and a receive mode, wherein the at least two slave nodes each comprises a transmit mode, a receive mode and a sleep mode. In this regard, for a given time slot, the master node operates on the transmit mode and the at least two slave nodes each operates on the receive mode or on the sleep mode. Additionally or alternatively, for a given time slot, the master node operates on the receive mode and the at least two slave nodes operate on the transmit mode or on the receive mode or on the sleep mode. This allows a high degree of flexibility for scheduling the communicating nodes based on their operating roles in the network.

In at least some implementations, an identity of the master node and of the at least two slave nodes are known to each other. Alternatively, the identity of the master node and of the at least two slave nodes are unknown to each other. An identity of a communicating node can be understood as a public key, a public key certificate, or a digital certificate of the node.

In at least some implementations, the master node is configured to be operable as a verifier node and the at least two slave nodes each is configured to be operable as a prover node, wherein the system comprises at least one further verifier node. In this regard, the master node is configured to authenticate the at least one further verifier node with a pair-wise authentication key for the pair of master node and the at least one further verifier node. Hence, multiple verifier nodes and multiple prover nodes are provided while at least one verifier node operates as a master node. The implementation of multiple verifiers and multiple provers provides benefits such as higher attack resilience, improved availability by avoiding a single point of compromise or failure, as well as localization using multilateration.

The master node can be configured to transmit a message comprising the pair-wise authentication keys for each pair of master node and slave nodes and/or the group authentication key to the at least one further verifier node, encrypted with the pair-wise authentication key for the pair of master node and the at least one further verifier node. In this context, the at least one further verifier node is configured to decrypt the message with the pair-wise authentication key for the pair of master node and the at least one further verifier node. Hence, the group authentication key is used to secure the communication between the master verifier and the rest of verifiers and provers. Additionally, the pair-wise authentication key is used to secure the communication between a prover or a verifier and the master verifier.

According to a second example implementation, a method is provided for performing secure key exchange between a plurality of nodes of a communication network. The method comprises authenticating, by a master node, at least two slave nodes with a pair-wise authentication key corresponding to each pair of master node and slave nodes. In addition, the method comprises generating, by the master node, a group authentication key common to the plurality of nodes.

The method further comprises encrypting, by the master node, the group authentication key with the pair-wise authentication key for each respective pair of master node and slave nodes, thereby generating a respective encrypted group authentication key. The method moreover comprises communicating, by the master node, the encrypted group authentication key to the respective slave nodes. A high degree of security is incorporated while performing secure communication with a particular node, since the group authentication key and the pair-wise authentication key are used side-by-side to secure the communication among the nodes.

The method further comprises communicating, by the master node, with the at least two slave nodes simultaneously.

The method further comprises receiving, by the at least two slave nodes, the respective encrypted group authentication key from the master node sequentially or simultaneously. In addition, the method further comprises decrypting, by each of the at least two slave nodes, the encrypted group authentication key with its respective pair-wise authentication key.

BRIEF DESCRIPTION OF THE FIGURES

The above, as well as additional, features will be better understood through the following illustrative and non-limiting detailed description of example embodiments, with reference to the appended drawings.

FIG. 4B shows a scheduling arrangement of the communicating nodes of FIG. 4A according to an example embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Reference will now be made in detail to the embodiments of the present description, examples of which are illustrated in the accompanying drawings. However, the following embodiments of the present description may be variously modified and the range of the present description is not limited by the following embodiments.

The present description relates to secure authentication, especially employed in cryptographic protocols such as distance bounding protocols, where a verifier establishes an upper bound on the physical distance to a prover. In the following description, the communicating nodes are labeled as a prover node or a verifier node, based on their role in the communication network. It is to be understood that, in a general case, "prover node" and "verifier node" are mere labels for, respectively, a first and a second node between which secure communication is performed. However, as a specific example, the verifier node may control access to a resource and the prover node may be used to gain access to the resource controlled by the verifier node, by virtue, at least in part, of physical proximity between the prover node and the verifier node.

Figure 1:
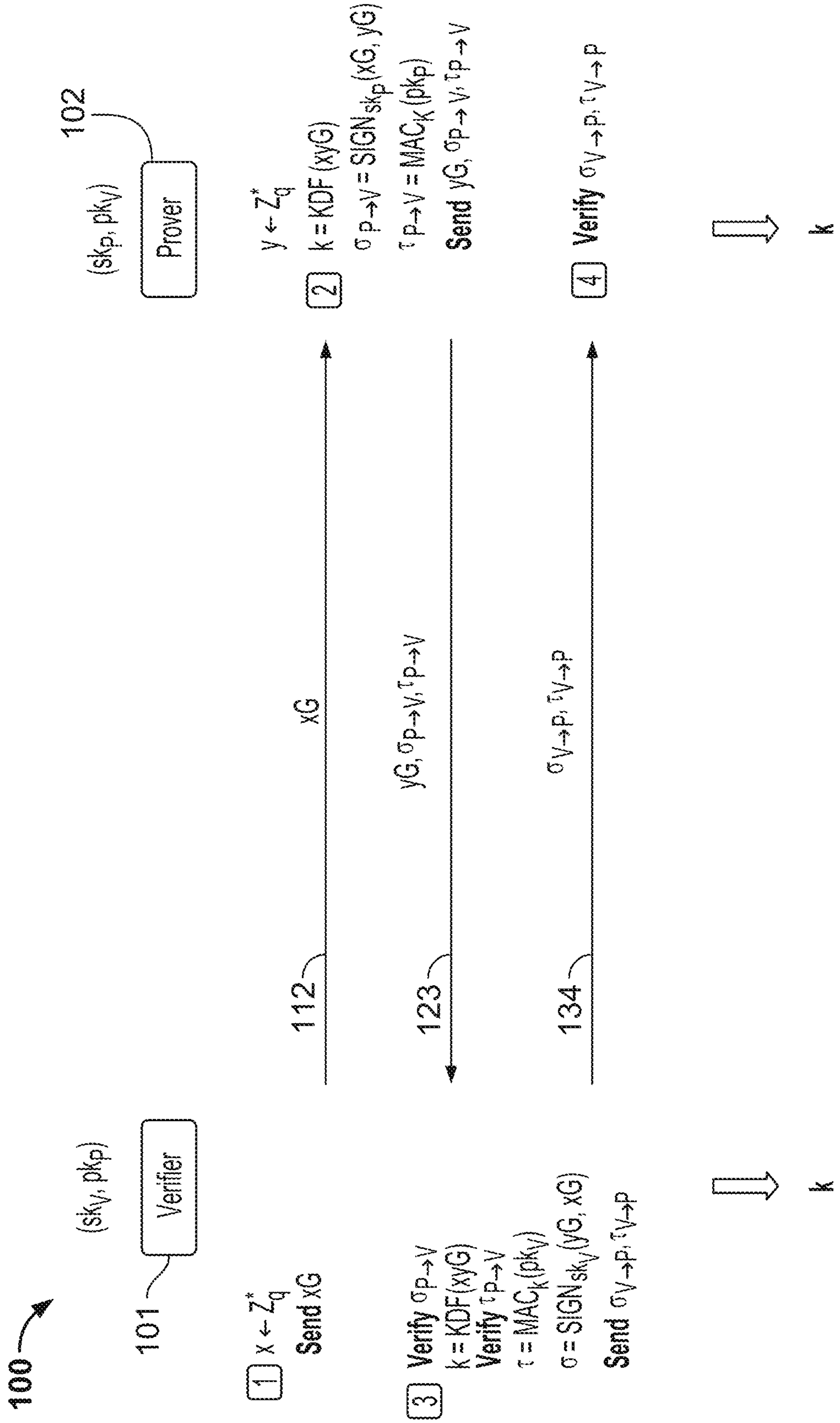
FIG. 1 shows a schematic description of a two-party authenticated key exchange (AKE) protocol according to an example embodiment.

In FIG. 1, a schematic description 100 of a two-party authenticated key exchange (AKE) protocol is illustrated as an elliptic curve based version. The schematic description of the AKE protocol 100 is illustrated based on the two-party AKE disclosed in "Krawczyk, H., SIGMA: The 'SIGn-and-Mac' approach to authenticated Diffie-Hellman and its use in the IKE protocols, Annual International Cryptology Conference, pp. 400-425, Springer, Berlin, Heidelberg, August 2003".

The schematic description 100 is illustrated for two parties, namely a verifier 101 and a prover 102. It is to be understood that the public parameters for the elliptic curve, such as the order q, generator G, and the like are known to both verifier 101 and prover 102. The verifier 101 generates a random element x as an ephemeral private key from Zq*, and computes an ephemeral public key xG. Thus, x and xG are verifier's ephemeral or session private key and ephemeral or session public key, respectively. The verifier 101 then transmits its ephemeral public key xG to the prover 102 in a first transmission 112.

Upon receiving the transmission 112, particularly upon receiving the verifier's public key xG, the prover 102 generates a random element y as an ephemeral private key from Zq*, and computes an ephemeral public key yG. Thus, y and yG are prover's ephemeral or session private key and ephemeral or session public key, respectively.

Next, the prover 102 computes a shared key k as:

$$k=\mathrm{KDF}(xyG)$$

where KDF is a key derivation function implemented to destroy any algebraic structures in xyG.

Then, the prover 102 computes a digital signature $\sigma_{P\rightarrow V}$ on xG and yG as:

$$\sigma_{P\rightarrow V}=\mathrm{SIGN}_{sk_P}(xG,yG)$$

where $sk_P$ is a long term private key of the prover 102.

In addition, the prover 102 computes a message authentication code (MAC) $\tau_{P\rightarrow V}$ using the computed shared key k as:

$$\tau_{P\rightarrow V}=\mathrm{MAC}_k(pk_P)$$

where $pk_P$ is a long term public key of the prover 102. Here, MAC serves as key confirmation in order to make sure that both verifier 101 and prover 102 computed the same shared key k.

Finally, the prover 102 transmits its ephemeral public key yG, the computed digital signature $\sigma_{P\rightarrow V}$, and the computed MAC tag $\tau_{P\rightarrow V}$, to the verifier 101 in a second transmission 123.

Upon receiving the transmission 123, particularly upon receiving the prover's ephemeral public key yG, the digital signature $\sigma_{P\rightarrow V}$, and the MAC tag $\tau_{P\rightarrow V}$, the verifier 101 verifies the digital signature $\sigma_{P\rightarrow V}$ using the prover's long term public key $pk_P$. If the digital signature is valid, the verifier 101 computes the shared key k as:

$$k=\mathrm{KDF}(xyG)$$

where KDF is a key derivation function implemented to destroy any algebraic structures in xyG.

If, however, the signature is invalid, the protocol is aborted. Next, the verifier 101 verifies the MAC tag $\tau_{P\rightarrow V}$ using the computed shared key k. Again, if the MAC tag is invalid, the protocol is aborted.

Then, the verifier 101 computes a digital signature $\sigma_{V\rightarrow P}$ on yG and xG as:

$$\sigma_{V\rightarrow P}=\mathrm{SIGN}_{sk_V}(yG,xG)$$

where $sk_V$ is a long term private key of the verifier 101.

In addition, the verifier 101 computes a message authentication code (MAC) $\tau_{V\rightarrow P}$ using the computed shared key k as:

$$\tau_{V\rightarrow P}=\mathrm{MAC}_k(pk_V)$$

where $pk_V$ is a long term public key of the verifier 101.

Finally, the verifier 101 transmits the computed digital signature $\sigma_{V\rightarrow P}$, and the computed MAC tag $\tau_{V\rightarrow P}$ to the prover 102 in a third transmission 134.

Upon receiving the transmission 134, particularly upon receiving the digital signature $\sigma_{V\rightarrow P}$, and the MAC tag $\tau_{V\rightarrow P}$, the prover 102 verifies their validity. If either one of them is invalid, the protocol is aborted. Otherwise, the protocol is successful and the shared key k will be used in the next phase, e.g. in distance bounding.

It is to be noted that the verifier 101 and the prover 102 do not communicate their identities, e.g. a public key or a certificate on the public key, to each other, since they are assumed to know each other's identities. However, it is possible to extend the above-described two-party AKE protocol for parties who do not have each other's identities beforehand.

For instance, in the second transmission 123, the prover 102 may transmit its long term public key $pk_P$ in addition to its ephemeral public key yG, the computed digital signature $\sigma_{P\rightarrow V}$, and the computed MAC tag $\tau_{P\rightarrow V}$, to the verifier 101. Hence, the verifier 101 will be able to verify the digital signature $\sigma_{P\rightarrow V}$ using the prover's long term public key $pk_P$. Analogously, in the third transmission 134, the verifier 101 may transmit its long term public key $pk_V$ in addition to the computed digital signature $\sigma_{V\rightarrow P}$, and the computed MAC tag $\tau_{V\rightarrow P}$ to the prover 102. Hence, the prover 102 will be able to verify the digital signature $\sigma_{V\rightarrow P}$ using the verifier's long term public key $pk_V$.

Figure 2:
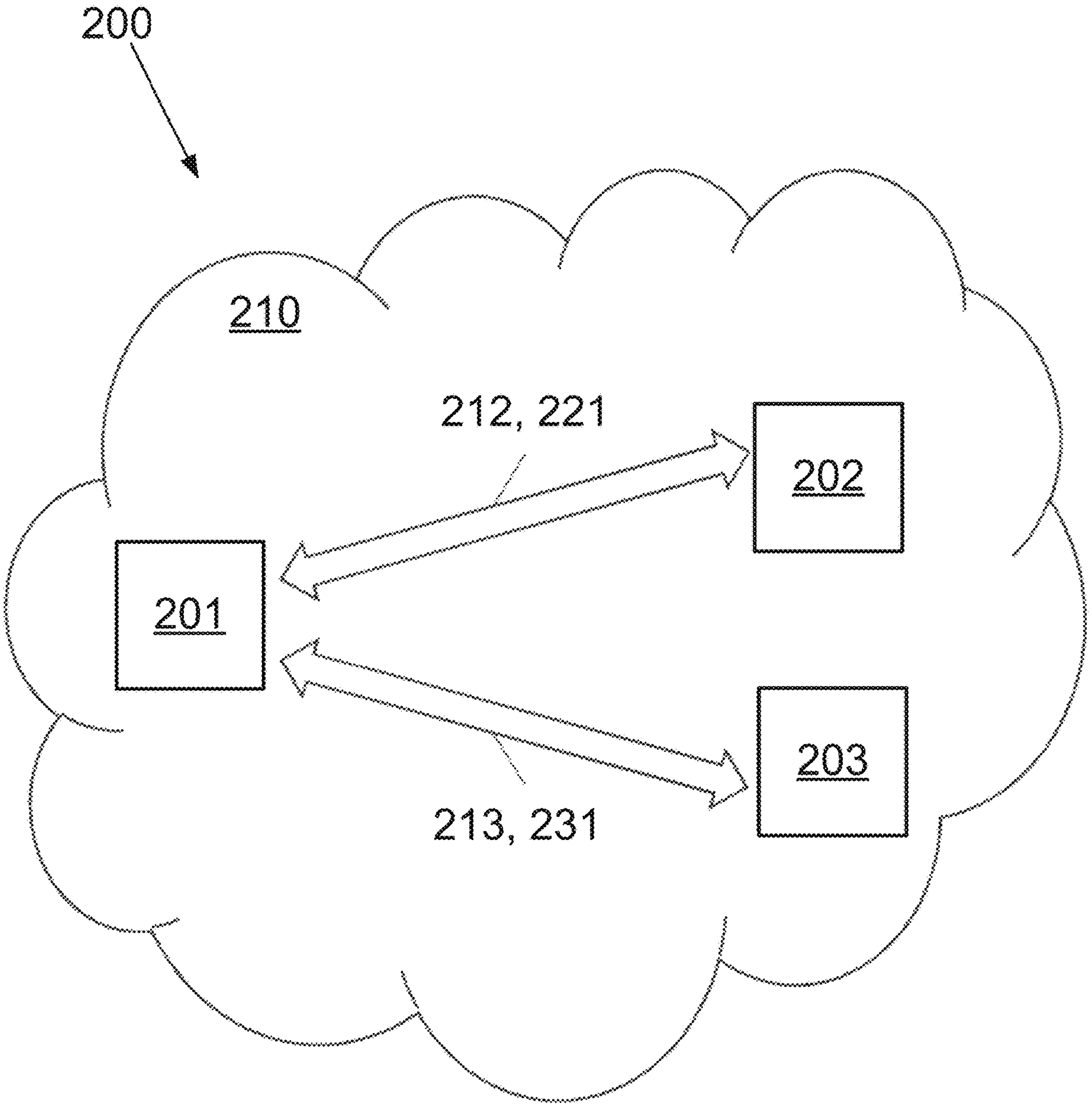
FIG. 2 shows a block representation of the system according to an example embodiment.

In FIG. 2, an exemplary block representation of the system 200 according to the first implementation is illustrated. The system 200 comprises a master node or device or entity 201 and at least two slave nodes or devices or entities 202, 203, communicating with each other in a communication network 210, e.g. a wireless network. Although only two slave nodes 202, 203 are illustrated herein, the number of slave nodes can be more than two. However, the number of simultaneously communicating slave nodes is limited by the amount of network resource allocated by the communication network 210.

Herein, the master node 201 communicates with the slave nodes 202, 203 so as to form a master-slave pair with each corresponding slave nodes 202, 203, in order to authenticate and to further communicate. The transmission direction of broadcasts between each master-slave pair is depicted as a respective two-directional arrow as a transmission path, however only exemplarily. For instance, the master node 201 may communicate with a first slave node 202 through a transmission path 212, and the first slave node may communicate with the master node through a transmission path 221. Analogously, the master node 201 may communicate with a second slave node 203 through a transmission path

213, and the second slave node may communicate with the master node through a transmission path 231.

In at least some implementations, the master node 201 agrees on a unique pair-wise authentication key with each slave node 202, 203. During this procedure, a mutual authentication between the master node 201 and the respective slave nodes 202, 203 takes place. Then, the master node 201 generates a group authentication key that is common for all slave nodes of the network group, and encrypts the group authentication key with the respective pair-wise authentication key for each master-slave pair. Next, the master node 201 communicates the encrypted group authentication key to the slave nodes 202, 203. Thus, the respective slave nodes 202, 203 is only able to decrypt the encrypted group authentication key with its designated pair-wise authentication key.

Figure 3:
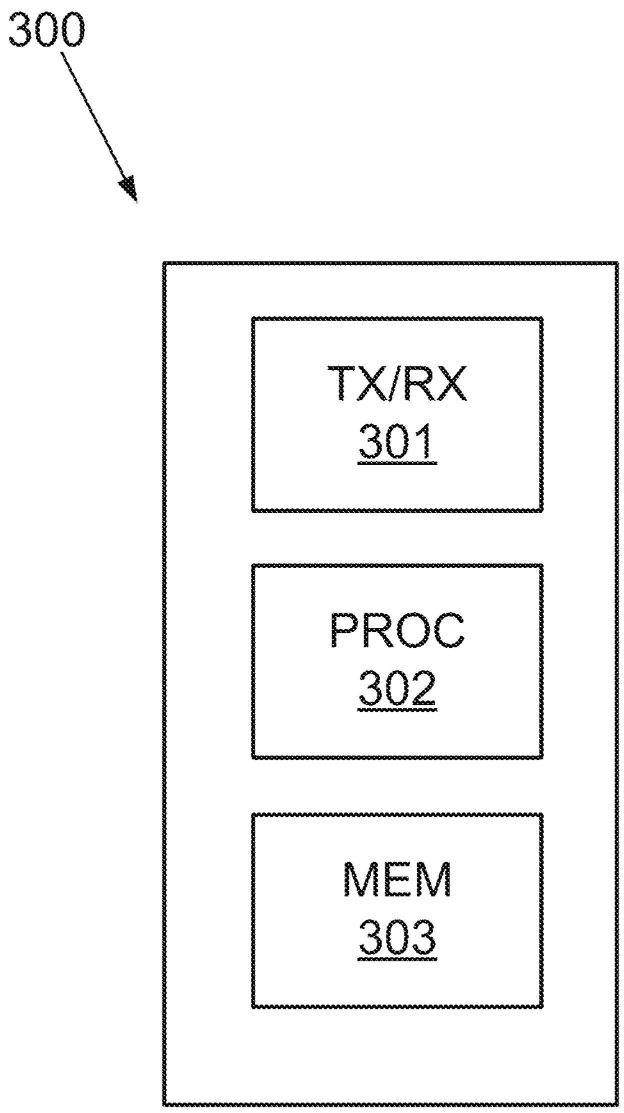
FIG. 3 shows an exemplary block representation of a node according to an example embodiment.

In FIG. 3, an exemplary block representation of a communicating node 300, e.g. a master node 201 or a slave node 202 or 203, is illustrated. The communicating node 300 comprises a transceiver module 301 for broadcasting communication as well as to receive broadcasts to and from a neighboring communicating node. The communicating node 300 further comprises a processing module or processor 302, operably coupled to the transceiver module 301. The communicating node 300 moreover comprises a memory module or memory 303, operably coupled to the processing module 302.

For example, the communicating node 300 may be generalized as a mobile or fixed station device, a mesh point device, or a hub device representing either an access point device in an infrastructure network or a group owner device in a peer-to-peer network, in accordance with example embodiments. The communicating node 300 may be a modern smartphone configured as an access point so that it may share its cellular telephone connection with other surrounding devices via a WLAN link.

The processing module 302 may include a single core central processing unit (CPU) or multiple core CPU, interface circuits to interface with the transceiver module 301, battery or house power sources, keyboard, display, etc. The memory module 303 may include a random access memory (RAM), a programmable read only memory (PROM), removable memory devices such as smart cards, SIMs, WIMs, flash memory devices, or a combination thereof.

The functional instructions respective to the role of the communicating node 300 within the communication network, e.g. being a verifier or a prover or both, may be implemented as computer code instructions stored in the memory module 303, which when executed by the processing module 302, carry out the functions of the example embodiments.

Figure 4A:
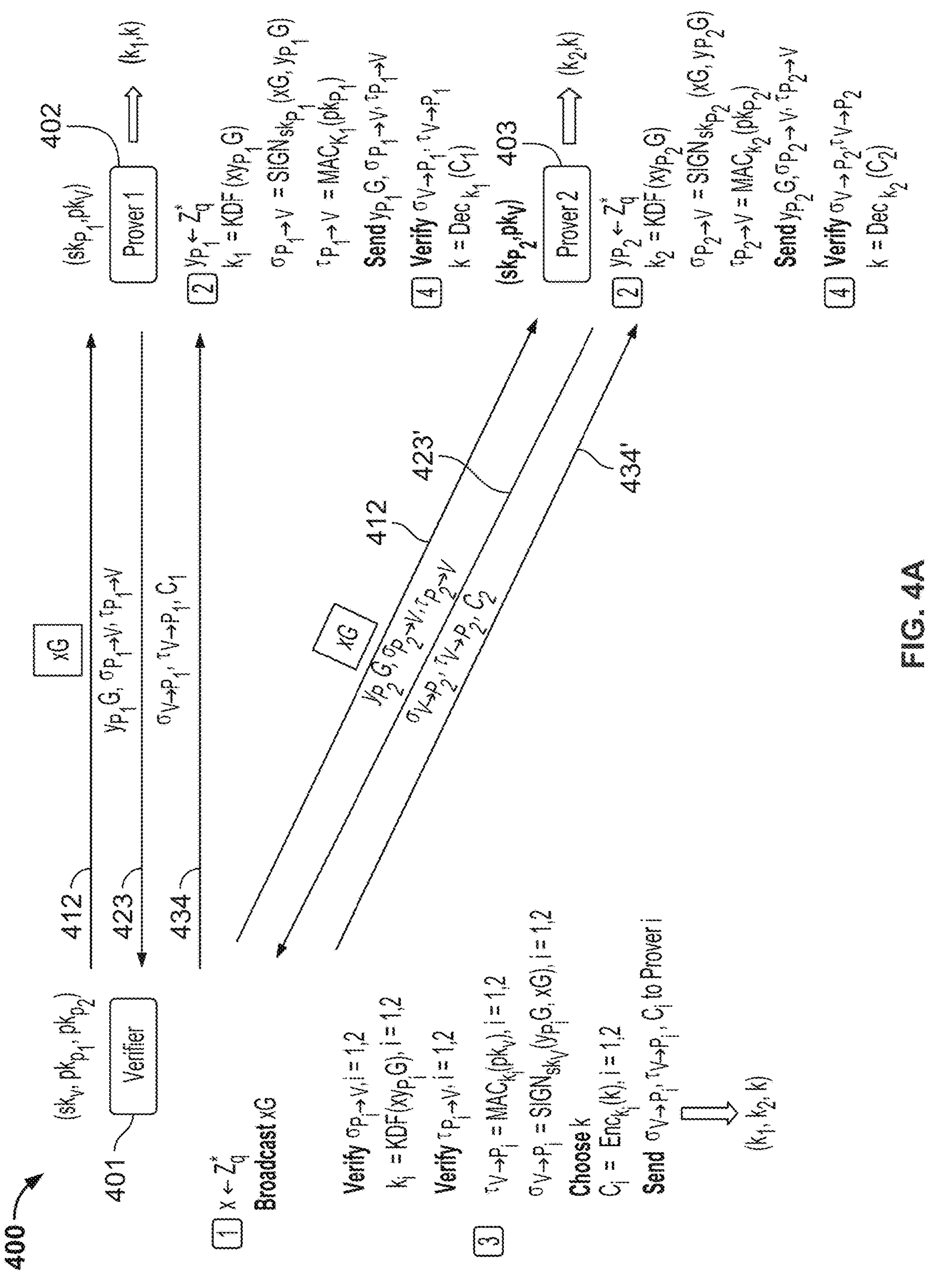
FIG. 4A shows a first authentication arrangement according to an example embodiment.

Next, in FIG. 4A and FIG. 4B, a first authentication arrangement 400 according to the first implementation is illustrated. Particularly, FIG. 4A shows a master node operating as a verifier node 401, whereas a first slave node and a second slave node operating as a first prover node 402 and a second prover node 403, respectively. FIG. 4B shows an exemplary operation schedule for the nodes of the network group. The verifier node 401 may correspond to the master node 201 of FIG. 2. Additionally, the first prover node 402 and the second prover node 403 may correspond to the first slave node 202 and the second slave node 203 of FIG. 2, respectively, or vice versa. The authentication arrangement 400 represents a schematic description of an extended authenticated key exchange based on elliptic curve. It is assumed that the public parameters for the elliptic curve, such as the order q, generator G, and the like are known to the verifier node 401 and the prover nodes 402, 403.

The verifier node 401 generates a random element x as its ephemeral private key from Zq*, and computes its ephemeral public key xG. The verifier node 401 then transmits its ephemeral public key xG to the first prover node 402 and to the second prover node 403 simultaneously in a first transmission 412.

Upon receiving the transmission 412, particularly upon receiving the verifier node's ephemeral public key xG, the first prover node 402 generates a random element $y_{P_1}$ as its ephemeral private key from Zq*, and computes its ephemeral public key $y_{P_1}G$. Next, the first prover node 402 computes a pair-wise authentication key $k_1$ for the pair of the verifier node 401 and the first prover node 402 as:

$$k_1=\mathrm{KDF}(xy_{P_1}G)$$

where KDF is a key derivation function implemented to destroy any algebraic structures in $xy_{P_1}G$.

Then, the first prover node 402 computes a digital signature $\sigma_{P_1\rightarrow V}$ on xG and $y_{P_1}G$ using its long term private key $sk_{P_1}$ as:

$$\sigma_{P_1\rightarrow V}=\mathrm{SIGN}_{sk_{P_1}}(xG,\ y_{P_1}G).$$

In addition, the first prover node 402 computes a message authentication code (MAC) $\tau_{P_1\rightarrow V}$ on its long term public key $pk_{P_1}$ using the computed pair-wise authentication key $k_1$ as:

$$\tau_{P_1\rightarrow V}=\mathrm{MAC}_{k_1}(pk_{P_1}).$$

Here, MAC serves as key confirmation in order to make sure that both the verifier node 401 and the first prover node 402 computed the same pair-wise authentication key $k_1$.

Finally, the first prover node 402 transmits its ephemeral public key $y_{P_1}G$, the computed digital signature $\sigma_{P_1\rightarrow V}$, and the computed MAC tag $\tau_{P_1\rightarrow V}$ to the verifier node 401 in a second transmission 423.

Simultaneously or sequentially, upon receiving the transmission 412, particularly upon receiving the verifier node's ephemeral public key xG, the second prover node 403 generates a random element $y_{P_2}$ as its ephemeral private key from Zq*, and computes its ephemeral public key $y_{P_2}G$. Next, the second prover node 403 computes a pair-wise authentication key $k_2$ for the pair of the verifier node 401 and the second prover node 403 as:

$$k_2=\mathrm{KDF}(xy_{P_2}G)$$

where KDF is a key derivation function implemented to destroy any algebraic structures in $xy_{P_2}G$.

Then, the second prover node 403 computes a digital signature $\sigma_{P_2\rightarrow V}$ on xG and $y_{P_2}G$ using its long term private key $sk_{P_2}$ as:

$$\sigma_{P_2\rightarrow V}=\mathrm{SIGN}_{sk_{P_2}}(xG,\ y_{P_2}G).$$

In addition, the second prover node 403 computes a message authentication code (MAC) $\tau_{P_2\rightarrow V}$ on its long term public key $pk_{P_2}$ using the computed pair-wise authentication key $k_2$ as:

$$\tau_{P_2\rightarrow V}\mathbf{32}\ \mathrm{MAC}_{k_2}(pk_{P_2}).$$

Here, MAC serves as key confirmation in order to make sure that both the verifier node 401 and the second prover node 403 computed the same pair-wise authentication key $k_2$.

Finally, the second prover node 403 transmits its ephemeral public key $y_{P_2}G$, the computed digital signature $\sigma_{P_2\rightarrow V}$, and the computed MAC tag $\tau_{P_2\rightarrow V}$ to the verifier node 401 in a second transmission 423'.

The verifier node 401 receives the transmissions 423 and 423' from the first prover node 402 and the second prover node 403, respectively, either simultaneously or sequentially. Upon receiving the respective prover's ephemeral public key, the digital signature and the MAC tag, the verifier node 401 verifies the digital signatures using the respective prover's long term public key. If the digital signature is valid, the verifier node 401 computes the respective pair-wise authentication key for the respective prover nodes as:

$$k_i = \mathrm{KDF}(xy_{P_i}G)$$

where, i=1 denotes the first prover node 402, and i=2 denotes the second prover node 403, and so on.

However, if the digital signature is invalid, the protocol is aborted. Next, the verifier node 401 verifies the respective MAC tags of the first prover node 402 and the second prover node 403 using the respective computed pair-wise authentication key $k_i$. Again, if the MAC tag is invalid, the protocol is aborted.

Then, the verifier node 401 computes a respective digital signature for the respective prover nodes 402, 403 on the respective prover's ephemeral public key and the verifier's ephemeral public key using its long term private key $sk_V$ as:

$$\sigma_{V\rightarrow P_i} = \mathrm{SIGN}_{sk_V}(y_{P_i}G, xG)$$

where, i=1 denotes the first prover node 402, and i=2 denotes the second prover node 403, and so on.

In addition, the verifier node 401 computes a respective message authentication code (MAC) on its long term public key $pk_V$ for the respective prover nodes 402, 403 using the respective computed pair-wise authentication key $k_i$ as:

$$\tau_{V\rightarrow P_i} = \mathrm{MAC}_{k_i}(pk_V)$$

where, i=1 denotes the first prover node 402, and i=2 denotes the second prover node 403, and so on.

Further, the verifier node 401 generates a random element k as a group authentication key for all the nodes of the network group. The verifier node 401 encrypts the group authentication key k with the respective computed pair-wise authentication key $k_i$ for the respective prover nodes 402, 403 as:

$$C_i = \mathrm{Enc}_{k_i}(k)$$

where, i=1 denotes the first prover node 402, and i=2 denotes the second prover node 403, and so on.

Finally, the verifier node 401 transmits the computed digital signatures $\sigma_{V\rightarrow P_i}$, the computed MAC tags $\tau_{V\rightarrow P_i}$, and the encrypted group authentication key $C_i$ to the respective prover nodes 402, 403, either simultaneously or sequentially, in a third transmission 434, 434'.

Upon receiving the transmission 434, e.g. upon receiving the digital signature $\sigma_{V\rightarrow P_1}$, the MAC tag $\tau_{V\rightarrow P_1}$, and the encrypted group authentication key $C_1$, the first prover node 402 verifies their validity. If either one of them is invalid, the protocol is aborted. The first prover node 402 then decrypts the encrypted group authentication key $C_1$ to obtain the group authentication key as:

$$k = \mathrm{Dec}_{k_1}(C_1).$$

If the digital signature and the MAC tag are valid, the protocol is successful and the group authentication key k will be used in the next phase, e.g. in distance bounding.

Simultaneously or sequentially, upon receiving the transmission 434', e.g. upon receiving the digital signature $\sigma_{V\rightarrow P_2}$, the MAC tag $\tau_{V\rightarrow P_2}$, and the encrypted group authentication key $C_2$, the second prover node 403 verifies their validity. If either one of them is invalid, the protocol is aborted. The second prover node 403 then decrypts the encrypted group authentication key $C_2$ to obtain the group authentication key as:

$$k = \mathrm{Dec}_{k_2}(C_2).$$

If the digital signature and the MAC tag are valid, the protocol is successful and the group authentication key k will be used in the next phase, e.g. in distance bounding.

It is to be noted that the verifier node 401 and the prover nodes 402, 403 do not communicate their identities, e.g. a public key or a certificate on the public key, to each other, since they are assumed to know each other's identities. However, it is possible to extend the above-described protocol for parties who do not have each other's identities beforehand, as discussed with respect to FIG. 1 above.

Turning back to FIG. 4B, the exemplary scheduling of the communicating nodes is illustrated for N number of nodes, where at least one node acts as a master node and remaining N−1 nodes act as slave nodes. The period of operation for each node is defined as a time slot, which is repetitive after N number of time slots. For example, during a first time slot 1, the master node is operating on transmit mode (Tx) and all the slave nodes are operating on receive mode (Rx). Thus, it is conceivable that the master node simultaneously broadcasts the first transmission towards the slave nodes and the slave nodes simultaneously receive the first broadcast from the master node.

During a second time slot 2, e.g. the first slave node is operating on transmit mode (Tx) and the master node is operating on receive mode (Rx), whereas all the remaining slave nodes are operating on sleep mode (I), i.e. possess an idle state of operation. The idle operation of the remaining slave nodes significantly reduces the cumulative loading on network resources. For each successive time slots, the subsequent slave nodes are operating on transmit mode one by one, while the rest of the slave nodes are in idle state, and the master node remains at its receive mode. The above scheduling again repeats after the time slot N.

Figure 5:
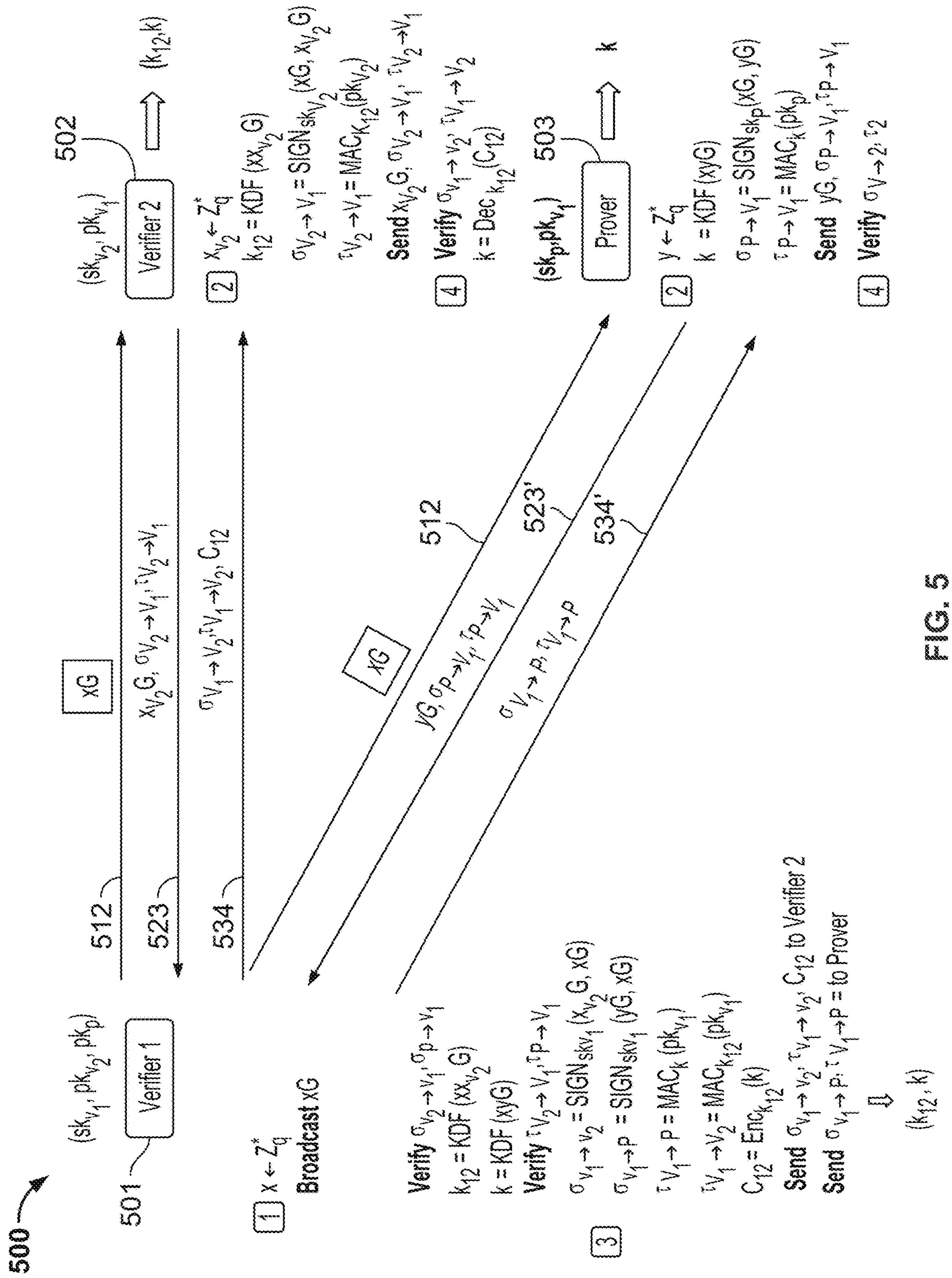
FIG. 5 shows a second authentication arrangement according to an example embodiment.

In FIG. 5, a second exemplary authentication arrangement 500 according to the first implementation is illustrated. Particularly, FIG. 5 shows a master node operating as a first verifier node 501, whereas a first slave node and a second slave node operating as a second verifier node 502 and a prover node 503, respectively. The first verifier node 501 may correspond to the master node 201 of FIG. 2. Additionally, the second verifier node 502 and the prover node 503 may correspond to the first slave node 202 and the second slave node 203 of FIG. 2, respectively, or vice versa. The authentication arrangement 500 represents a schematic description of an extended authenticated key exchange based on elliptic curve. It is assumed that the public parameters for the elliptic curve, such as the order q, generator G, and the like are known to the first verifier node 501, the second verifier node 502, and the prover node 503.

The first verifier node 501 generates a random element x as its ephemeral private key from Zq*, and computes its ephemeral public key xG. The first verifier node 501 then transmits its ephemeral public key xG to the second verifier node 502 and to the prover node 503 simultaneously in a first transmission 512.

Upon receiving the transmission 512, particularly upon receiving the first verifier node's ephemeral public key xG, the second verifier node 502 generates a random element $x_{V_2}$ as its ephemeral private key from Zq*, and computes its ephemeral public key $x_{V_2}G$. Next, the second verifier node 502 computes a pair-wise authentication key $k_{12}$ for the pair of the first verifier node 501 and the second verifier node 502 as:

$$k_{12}=\mathrm{KDF}(xx_{V_2}G)$$

where KDF is a key derivation function implemented to destroy any algebraic structures in $xx_{V_2}G$.

Then, the second verifier node 502 computes a digital signature $\sigma_{V_2\rightarrow V_1}$ on xG and $x_{V_2}G$ using its long term private key $sk_{V_2}$ as:

$$\sigma_{V_2\rightarrow V_1}=\mathrm{SIGN}_{sk_{V_2}}(xG, x_{V_2}G).$$

In addition, the second verifier node 502 computes a message authentication code (MAC) $\tau_{V_2\rightarrow V_1}$ on its long term public key $pk_{V_2}$ using the computed pair-wise authentication key $k_{12}$ as:

$$\tau_{V_2\rightarrow V_1}=\mathrm{MAC}_{k_{12}}(pk_{V_2}).$$

Here, MAC serves as key confirmation in order to make sure that both the first verifier node 501 and the second verifier node 502 computed the same pair-wise authentication key $k_{12}$.

Finally, the second verifier node 502 transmits its ephemeral public key $x_{V_2}G$, the computed digital signature $\sigma_{V_2\rightarrow V_1}$, and the computed MAC tag $\tau_{V_2\rightarrow V_1}$ to the first verifier node 501 in a second transmission 523.

Simultaneously or sequentially, upon receiving the transmission 512, particularly upon receiving the verifier node's ephemeral public key xG, the prover node 503 generates a random element y as its ephemeral private key from Zq*, and computes its ephemeral public key yG. Next, the prover node 503 computes a pair-wise authentication key k for the pair of the first verifier node 501 and the prover node 503 as:

$$k=\mathrm{KDF}(xyG)$$

where KDF is a key derivation function implemented to destroy any algebraic structures in xyG.

Then, the prover node 503 computes a digital signature $\sigma_{P\rightarrow V_1}$, on xG and yG using its long term private key $sk_P$ as:

$$\sigma_{P\rightarrow V_1}=\mathrm{SIGN}_{sk_P}(xG,yG).$$

In addition, the prover node 503 computes a message authentication code (MAC) $\tau_{P\rightarrow V_1}$ on its long term public key $pk_P$ using the computed pair-wise authentication key k as:

$$\tau_{P\rightarrow V_1}=\mathrm{MAC}_k(pk_P).$$

Here, MAC serves as key confirmation in order to make sure that both the first verifier node 501 and the prover node 503 computed the same pair-wise authentication key k.

Finally, the prover node 503 transmits its ephemeral public key yG, the computed digital signature $\sigma_{P\rightarrow V_1}$ and the computed MAC tag $\tau_{P\rightarrow V_1}$ to the first verifier node 501 in a second transmission 523'.

The verifier node 501 receives the transmissions 523 and 523' from the second verifier node 502 and the prover node 503, respectively, either simultaneously or sequentially. Upon receiving the respective slave's ephemeral public key, the digital signature and the MAC tag, the first verifier node 501 verifies the digital signatures using the respective slave's long term public key. If the digital signature is valid, the first verifier node 501 computes the respective pair-wise authentication key for the respective slave nodes as:

$$k_{12}=\mathrm{KDF}(xx_{V_2}G),\ \text{for the second verifier node 502, and}$$

$$k=\mathrm{KDF}(xyG),\ \text{for the prover node 503.}$$

However, if the digital signature is invalid, the protocol is aborted. Next, the first verifier node 501 verifies the respective MAC tags of the second verifier node 502 and the prover node 503 using the respective computed pair-wise authentication keys $k_{12}$, k. Again, if the MAC tag is invalid, the protocol is aborted.

Then, the first verifier node 501 computes a respective digital signature for the slave nodes 502, 503 on the slave's ephemeral public key and the first verifier's ephemeral public key using its long term private key $sk_{V_1}$ as:

$$\sigma_{V_1\rightarrow V_2}=\mathrm{SIGN}_{sk_{V_1}}(x_{V_2}G, xG),$$

for the second verifier node 502, and $$\sigma_{V_1\rightarrow P}=\mathrm{SIGN}_{sk_{V_1}}(yG, xG),$$

for the prover node 503.

In addition, the first verifier node 501 computes a respective message authentication code (MAC) on its long term public key $pk_{V_1}$ for the respective slave nodes 502, 503 using the respective computed pair-wise authentication key $k_{12}$, k as:

$$\tau_{V_1\rightarrow V_2}=\mathrm{MAC}_{k_{12}}(pk_{V_1}),\ \text{for the second verifier node 502, and}$$

$$\tau_{V_1\rightarrow P}=\mathrm{MAC}_k(pk_{V_1}),\ \text{for the prover node 503.}$$

Since the illustrated embodiment comprises only one prover node 503, the first verifier node 501 selects the computed pair-wise authentication key k as a group authentication key for the group of the first verifier node 501, the second verifier node 502 and the prover node 503. This process contradicts to the embodiment of FIG. 4A, since the embodiment illustrated in FIG. 4A comprises a plurality of prover nodes 402, 403, and therefore the verifier node 401 was required to generate a random element as a group authentication key common for all the nodes of the network group.

Subsequently, the first verifier node 501 encrypts the group authentication key k with the computed pair-wise authentication key $k_{12}$ for the second verifier node 502, since only the second verifier node 502 does not possess the group authentication key k. Hence, the encrypted group authentication key may be formulated as:

$$C_{12}=\mathrm{Enc}_{k_{12}}(k).$$

Finally, the first verifier node 501 transmits the computed digital signatures, the computed MAC tags to the respective slave nodes 502, 503, either simultaneously or sequentially, in a third transmission 534, 534'. Additionally, the first verifier node 501 transmits the encrypted group authentication key to the second verifier node 502 in the third transmission 534.

Upon receiving the transmission 534, e.g. upon receiving the digital signature $\sigma_{V_1 \rightarrow V_2}$, the MAC tag $\tau_{V_1 \rightarrow V_2}$, and the encrypted group authentication key $C_{12}$, the second verifier node 502 verifies the validity of the digital signature and the MAC tag. If either one of them is invalid, the protocol is aborted. The second verifier node 502 then decrypts the encrypted group authentication key $C_{12}$ to obtain the group authentication key as:

$$k = \mathrm{Dec}_{k_{12}}(C_{12}).$$

If the digital signature and the MAC tag are valid, the protocol is successful and the group authentication key k will be used in the next phase, e.g. in distance bounding.

Simultaneously or sequentially, upon receiving the transmission 534', e.g. upon receiving the digital signature $\sigma_{V_1 \rightarrow P}$ and the MAC tag $\tau_{V_1 \rightarrow P}$, the prover node 503 verifies their validity. If either one of them is invalid, the protocol is aborted. If the digital signature and the MAC tag are valid, the protocol is successful and the group authentication key k, i.e. the pair-wise authentication key for the pair of first verifier node 501 and the prover node 503, will be used in the next phase, e.g. in distance bounding.

It is to be noted that the first verifier node 501, the second verifier node 502, and the prover node 503 do not communicate their identities, e.g. a public key or a certificate on the public key, to each other, since they are assumed to know each other's identities. However, it is possible to extend the above-described protocol for parties who do not have each other's identities beforehand, as discussed with respect to FIG. 1 above.

Figure 6:
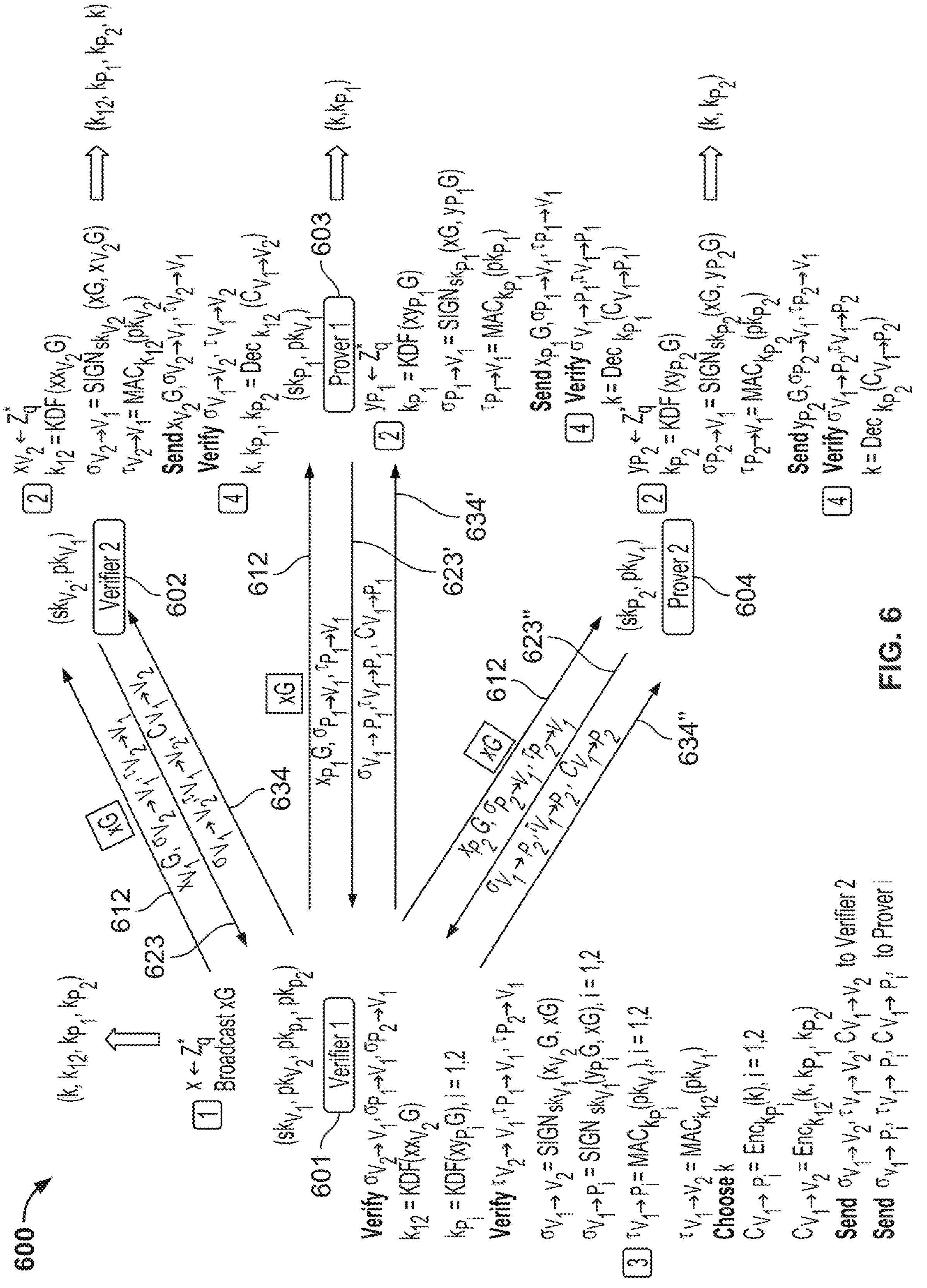
FIG. 6 shows a third authentication arrangement according to an example embodiment.

Next, FIG. 6 shows a third authentication arrangement 600 according to the first implementation is illustrated. Particularly, FIG. 6 shows a master node operating as a first verifier node 601, whereas a first slave node operating as a second verifier node 602, a second slave node operating as a first prover node 603, and a third slave node operating as a second prover node 604. The first verifier node 601 may correspond to the master node 201 of FIG. 2. Additionally, the second verifier node 602, the first prover node 603, and the second prover node 604 may correspond to any of the slave nodes 202, 203 of FIG. 2. The authentication arrangement 600 represents a schematic description of an extended authenticated key exchange based on elliptic curve. It is assumed that the public parameters for the elliptic curve, such as the order q, generator G, and the like are known to the verifier nodes 601, 602 as well as to the prover nodes 603, 604.

The first verifier node 601 generates a random element x as its ephemeral private key from Zq*, and computes its ephemeral public key xG. The first verifier node 601 then transmits its ephemeral public key xG to the second verifier node 602, to the first prover node 603, and to the second prover node 604 simultaneously in a first transmission 612.

Upon receiving the transmission 612, particularly upon receiving the first verifier node's ephemeral public key xG, the second verifier node 602 generates a random element $x_{V_2}$ as its ephemeral private key from Zq*, and computes its ephemeral public key $x_{V_2}G$. Next, the second verifier node 602 computes a pair-wise authentication key $k_{12}$ for the pair of the first verifier node 601 and the second verifier node 602 as:

$$k_{12} = \mathrm{KDF}(xx_{V_2}G)$$

where KDF is a key derivation function implemented to destroy any algebraic structures in $xx_{V_2}G$.

Then, the second verifier node 602 computes a digital signature $\sigma_{V_2 \rightarrow V_1}$ on xG and $x_{V_2}G$ using its long term private key $sk_{V_2}$ as:

$$\sigma_{V_2 \rightarrow V_1} = \mathrm{SIGN}_{sk_{V_2}}(xG, x_{V_2}G).$$

In addition, the second verifier node 602 computes a message authentication code (MAC) $\tau_{V_2 \rightarrow V_1}$ on its long term public key $pk_{V_2}$ using the computed pair-wise authentication key $k_{12}$ as:

$$\tau_{V_2 \rightarrow V_1} = \mathrm{MAC}_{k_{12}}(pk_{V_2}).$$

Here, MAC serves as key confirmation in order to make sure that both the first verifier node 601 and the second verifier node 602 computed the same pair-wise authentication key $k_{12}$.

Finally, the second verifier node 602 transmits its ephemeral public key $x_{V_2}G$, the computed digital signature $\sigma_{V_2 \rightarrow V_1}$, and the computed MAC tag $\tau_{V_2 \rightarrow V_1}$ to the first verifier node 601 in a second transmission 623.

Simultaneously or sequentially, upon receiving the transmission 612, particularly upon receiving the first verifier node's ephemeral public key xG, the first prover node 603 generates a random element $y_{P_1}$ as its ephemeral private key from Zq*, and computes its ephemeral public key $y_{P_1}G$. Next, the first prover node 603 computes a pair-wise authentication key $k_{P_1}$ for the pair of the first verifier node 601 and the first prover node 603 as:

$$k_{P_1} = \mathrm{KDF}(xy_{P_1}G)$$

where KDF is a key derivation function implemented to destroy any algebraic structures in $xy_{P_1}G$.

Then, the first prover node 603 computes a digital signature $\sigma_{P_1 \rightarrow V_1}$ on xG and $y_{P_1}G$ using its long term private key $sk_{P_1}$ as:

$$\sigma_{P_1 \rightarrow V_1} = \mathrm{SIGN}_{sk_{P_1}}(xG, y_{P_1}G).$$

In addition, the first prover node 603 computes a message authentication code (MAC) $\tau_{P_1 \rightarrow V_1}$ on its long term public key $pk_{P_1}$ using the computed pair-wise authentication key $k_{P_1}$ as:

$$\tau_{P_1 \rightarrow V_1} = MAC_{k_{P_1}}(pk_{P_1}).$$

Here, MAC serves as key confirmation in order to make sure that both the first verifier node 601 and the first prover node 603 computed the same pair-wise authentication key $k_{P_1}$.

Finally, the first prover node 603 transmits its ephemeral public key $y_{P_1}G$, the computed digital signature $\sigma_{P_1 \rightarrow V}$, and the computed MAC tag $\tau_{P_1 \rightarrow V}$ to the first verifier node 601 in a second transmission 623'.

Simultaneously or sequentially, upon receiving the transmission 612, particularly upon receiving the first verifier node's ephemeral public key xG, the second prover node 604 generates a random element $y_{P_2}$ as its ephemeral private key from Zq*, and computes its ephemeral public key $y_{P_2}G$. Next, the second prover node 604 computes a pair-wise authentication key $k_{P_2}$ for the pair of the first verifier node 601 and the second prover node 604 as:

$$k_{P_2}=\mathrm{KDF}(xy_{P_2}G)$$

where KDF is a key derivation function implemented to destroy any algebraic structures in $xy_{P_2}G$.

Then, the second prover node 604 computes a digital signature $\sigma_{P_2\rightarrow V_1}$ on xG and $y_{P_2}G$ using its long term private key $sk_{P_2}$ as:

$$\sigma_{P_2\rightarrow V_1}=\mathrm{SIGN}_{sk_{P_2}}(xG,\ y_{P_2}G).$$

In addition, the second prover node 604 computes a message authentication code (MAC) $\tau_{P_2\rightarrow V_1}$ on its long term public key $pk_{P_2}$ using the computed pair-wise authentication key $k_{P_2}$ as:

$$\tau_{P_2\rightarrow V_1}=MAC_{k_{P_2}}(pk_{P_2}).$$

Here, MAC serves as key confirmation in order to make sure that both the first verifier node 601 and the second prover node 604 computed the same pair-wise authentication key $k_{P_2}$.

Finally, the second prover node 604 transmits its ephemeral public key $y_{P_2}G$, the computed digital signature $\sigma_{P_2\rightarrow V_1}$, and the computed MAC tag $\tau_{P_2\rightarrow V_1}$ to the first verifier node 601 in a second transmission 623".

The first verifier node 601 receives the transmissions 623, 623', and 623" from the second verifier node 602, the first prover node 603, and the second prover node 604, respectively, either simultaneously or sequentially. Upon receiving the respective slave's ephemeral public key, the digital signature and the MAC tag, the first verifier node 601 verifies the digital signatures using the respective slave's long term public key. If the digital signature is valid, the first verifier node 601 computes the respective pair-wise authentication key for the respective slave nodes as:

$k_{12}=\mathrm{KDF}(xx_{V_2}G)$, for the second verifier node 602, and $k_{P_i}=\mathrm{KDF}(xy_{P_i}G)$, for the prover nodes 603,604;

where, i=1 denotes the first prover node 603, and i=2 denotes the second prover node 604.

However, if the digital signature is invalid, the protocol is aborted. Next, the first verifier node 601 verifies the respective MAC tags of the second verifier node 602, the first prover node 603, and the second prover node 604 using the respective computed pair-wise authentication key $k_{12}$, $k_{P_1}$, $k_{P_2}$. Again, if the MAC tag is invalid, the protocol is aborted.

Then, the first verifier node 601 computes a respective digital signature for the second verifier node 602, and the respective prover nodes 603, 604 on their ephemeral public keys and the first verifier's ephemeral public key using its long term private key $sk_{V_1}$, as:

$$\sigma_{V_1\rightarrow V_2}=\mathrm{SIGN}_{sk_{V_1}}(x_{V_2}G,\ xG),$$

for the second verifier node 602, and $$\sigma_{V_1\rightarrow P_i}=\mathrm{SIGN}_{sk_{V_1}}(y_{P_i}G,\ xG),$$

for the prover nodes 603, 604;

where, i=1 denotes the first prover node 603, and i=2 denotes the second prover node 604.

In addition, the first verifier node 601 computes a respective message authentication code (MAC) on its long term public key $pk_{V_1}$, for the respective slave nodes 602, 603, 604 using the respective computed pair-wise authentication key $k_{12}$, $k_{P_1}$, $k_{P_2}$ as:

$\tau_{V_1\rightarrow V_2}=\mathrm{MAC}_{k_{12}}(pk_{V_1})$, for the second verifier node 602, and $$\tau_{V_1\rightarrow P_i}=MAC_{k_{P_i}}(pk_{V_1}),$$

for the prover nodes 603, 604;

where, i=1 denotes the first prover node 603, and i=2 denotes the second prover node 604.

Further, the first verifier node 601 generates a random element k as a group authentication key for all the nodes of the network group. The first verifier node 601 encrypts the group authentication key k with the respective computed pair-wise authentication key $k_{12}$, $k_{P_i}$ for the respective slave nodes 602, 603, 604. Additionally, the first verifier node 601 encrypts the respective computed pair-wise authentication keys for the pair of the first verifier node 601 and the first prover node 603 as well as for the pair of the first verifier node 601 and the second prover node 604 along with the group authentication key for the second verifier node 602. The encrypted transmissions can be illustrated as:

$C_{V_1\rightarrow V_2}=\mathrm{Enc}_{k_{12}}(k,k_{P_1},k_{P_2})$, for the second verifier node 602, and $$C_{V_1\rightarrow P_i}=Enc_{k_{P_i}}(k),$$

for the prover nodes 603, 604;

where, i=1 denotes the first prover node 603, and i=2 denotes the second prover node 604.

Finally, the first verifier node 601 transmits the computed digital signatures, the computed MAC tags, and the encrypted group authentication key to the respective slave nodes 602, 603, 604, either simultaneously or sequentially, in a third transmission 634, 634', 634".

Upon receiving the transmission 634, e.g. upon receiving the digital signature $\sigma_{V_1\rightarrow V_1}$, the MAC tag $\tau_{V_1\rightarrow V_2}$, and the encrypted group authentication key $C_{V_1\rightarrow V_2}$, the second verifier node 602 verifies their validity. If either one of them is invalid, the protocol is aborted. The second verifier node 602 then decrypts the encrypted group authentication key $C_{V_1\rightarrow V_2}$ to obtain the group authentication key as well as the pair-wise authentication keys as:

$$k,k_{P_1},k_{P_2}=\mathrm{Dec}_{k_{12}}(C_{V_1\rightarrow V_2}).$$

If the digital signature and the MAC tag are valid, the protocol is successful and the group authentication key k will be used in the next phase, e.g. in distance bounding.

Simultaneously or sequentially, upon receiving the transmission 634', e.g. upon receiving the digital signature $\sigma_{V_1 \rightarrow P_1}$, the MAC tag $\tau_{V_1 \rightarrow P_1}$, and the encrypted group authentication key $C_{V_1 \rightarrow P_1}$, the first prover node 603 verifies their validity. If either one of them is invalid, the protocol is aborted. The first prover node 603 then decrypts the encrypted group authentication key $C_{V_1 \rightarrow P_1}$ to obtain the group authentication key as:

$$k = Dec_{k_{P_1}}(C_{V_1 \rightarrow P_1}).$$

If the digital signature and the MAC tag are valid, the protocol is successful and the group authentication key k will be used in the next phase, e.g. in distance bounding.

Simultaneously or sequentially, upon receiving the transmission 634", e.g. upon receiving the digital signature $\sigma_{V_1 \rightarrow P_2}$, the MAC tag $\tau_{V_1 \rightarrow P_2}$, and the encrypted group authentication key $C_{V_1 \rightarrow P_2}$, the second prover node 604 verifies their validity. If either one of them is invalid, the protocol is aborted. The second prover node 604 then decrypts the encrypted group authentication key $C_{V_1 \rightarrow P_2}$ to obtain the group authentication key as:

$$k = Dec_{k_{P_2}}(C_{V_1 \rightarrow P_2}).$$

If the digital signature and the MAC tag are valid, the protocol is successful and the group authentication key k will be used in the next phase, e.g. in distance bounding.

It is to be noted that the verifier nodes 601, 602 and the prover nodes 603, 604 do not communicate their identities, e.g. a public key or a certificate on the public key, to each other, since they are assumed to know each other's identities. However, it is possible to extend the above-described protocol for parties who do not have each other's identities beforehand, as discussed with respect to FIG. 1 above.

Figure 7:
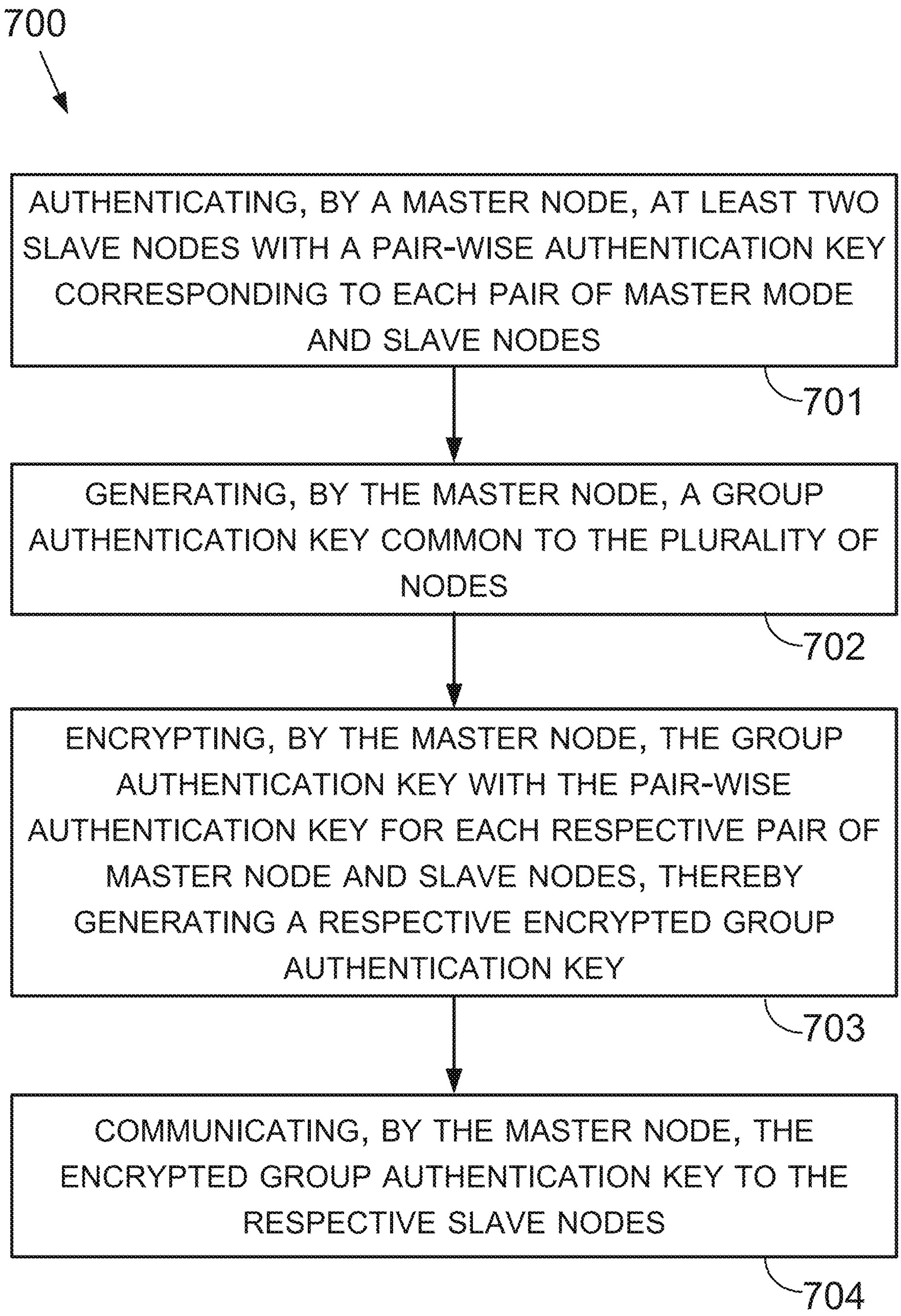
FIG. 7 shows a flowchart for a method according to an example embodiment.

In FIG. 7, an exemplary embodiment of the method 700 according to the second implementation is illustrated. In block 701, a master node authenticates at least two slave nodes with a pair-wise authentication key corresponding to each pair of master node and slave nodes. In block 702, the master node generates a group authentication key common to the plurality of nodes.

In block 703, the master node encrypts the group authentication key with the pair-wise authentication key for each respective pair of master node and slave nodes, thereby generates a respective encrypted group authentication key. Finally, in block 704, the master node communicates the encrypted group authentication key to the respective slave nodes.

This description describes a system and a method to efficiently authenticate several devices in close proximity and further to securely exchange authentication keys among the communicating nodes or entities. The underlying technique can be utilized for systems that require a high security and a high efficiency in distance measurements among multiple communicating nodes, e.g. wireless devices, particularly in close proximity. The term "security" refers to, e.g. impersonation and man-in-the-middle or relay attack resistance. The term "efficiency" refers to, e.g. low number of transmissions among the communicating nodes. The benefits include, but not limited to, higher attack resilience, improved availability by avoiding a single point of compromise or failure, as well as localization using multilateration.

It is important to note that, in the description as well as in the claims, the word "comprising" does not exclude other elements or steps and the indefinite article "a" or "an" does not exclude a plurality. A single element or other unit may fulfill the functions of several entities or items recited in the claims. It is further to be noted that the system according to the first aspect corresponds to the method according to the second aspect. Therefore, the disclosure with regard to any of the aspects is also relevant with regard to the other aspects of the description.

Although one or more implementations are illustrated and described herein, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired for any given or particular application.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

The invention claimed is:

1. A system configured to perform secure key exchange between a plurality of nodes of a communication network, the plurality of nodes comprising at least a master node, a first slave node, and a second slave node, the system comprising:

the master node;

the first slave node; and the second slave node, wherein:

the master node is configured to broadcast an ephemeral public key of the master node to the first and second slave nodes, the master node is configured to receive an ephemeral public key of the first slave node, a digital signature of the first slave node, and a first message authentic code tag based on a first pair-wise authentication key computed by the first slave node, the master node is configured to receive an ephemeral public key of the second slave node, a digital signature of the second slave node, and a second message authentic code tag computed using a second pair-wise authentication key computed by the second slave node, the master node is configured to compute the first pair-wise authentication key and the second pair-wise authentication key, the master node is configured to verify the first message authentication code tag is valid using the first pair-wise authentication key computed by the master node, the master node is configured to verify the second message authentication code tag is valid using the second pair-wise authentication key computed by the master node, the master node is configured to generate a group authentication key common to the plurality of nodes, the master node is configured to generate a digital signature for the first slave node on the ephemeral public key of the first slave node and the ephemeral public key of the master node using a long-term private key of the master node, the master node is configured to generate a digital signature for the second slave node on the ephemeral public key of the second slave node and the ephemeral public key of the master node using the long-term private key of the master node, the master node is configured to generate a first encrypted group authentication key by encrypting the group authentication key using the first pair-wise authentication key, and a third message authentication code tag by encrypting a long-term public key of the master node using the first pair-wise authentication key, the master node is configured to generate a second encrypted group authentication key by encrypting the group authentication key using the second pair-wise authentication key, and a fourth message authentication code tag by encrypting the long-term public key of the master node using the second pair-wise authentication key, the master node is configured to communicate, via a single transmission, the first encrypted group authentication key, the digital signature for the first slave node, and the third message authentication code tag to the first slave node and the second encrypted group authentication key, the digital signature for the second slave node, and the fourth message authentication code tag to the second slave node, the first slave node is configured to verify the digital signature of the first slave node and the third message authentication code tag are valid and decrypt the first encrypted group authentication key to obtain the group authentication key; and the second slave node is configured to verify the digital signature of the second slave node and the fourth message authentication code tag are valid and decrypt the second encrypted group authentication key to obtain the group authentication key.

2. The system according to claim 1, wherein:

the master node is configured to transmit an ephemeral public key to the first and second slave nodes, the first slave node is configured to compute the first pair-wise authentication key after receiving the ephemeral public key transmitted by the master node, and the second slave node is configured to compute the second pair-wise authentication key after receiving the ephemeral public key transmitted by the master node.

3. The system according to claim 2, wherein:

the first slave node is configured to compute, and transmit to the master node, a first digital signature, and a first message authentication code using the first pair-wise authentication key computed at the first slave node, the second slave node is configured to compute, and transmit to the master node, a second digital signature, and a second message authentication code using the second pair-wise authentication key computed at the second slave node, the master node is configured to verify the first digital signature is valid, compute the first pair-wise authentication key for the first slave node, and verify the first message authentication code is valid using the first pair-wise authentication key for the first slave node computed at the master node, and the master node is configured to verify the second digital signature is valid, compute the second pair-wise authentication key for the second slave node, and verify the second message authentication code is valid using the second pair-wise authentication key for the second slave node computed at the master node.

4. The system according to claim 3, wherein:

the first slave node is configured to compute the first message authentication code on a long term public key corresponding to the first slave node and the first pair-wise authentication key computed at the first slave node, and the second slave node is configured to compute the second message authentication code on a long term public key corresponding to the second slave node and the second pair-wise authentication key computed at the second slave node.

5. The system according to claim 1, wherein:

the first slave node is configured to decrypt the first encrypted group authentication key to obtain the group authentication key, and the second slave node is configured to decrypt the second encrypted group authentication key to obtain the group authentication key.

6. The system according to claim 5, wherein the first and second slave nodes are configured to use the group authentication key for distance bounding.

7. The system according to claim 1, wherein the master node, the first slave node and the second slave node are configured to synchronize with one another.

8. The system according to claim 1, wherein the master node, the first slave node, and the second slave node are configured to clock-synchronize with one another.

9. The system according to claim 1, wherein:

the master node comprises a first transmit mode and a first receive mode, and the first and second slave nodes both comprise a second transmit mode, a second receive mode, and a sleep mode.

10. The system according to claim 9, wherein:

for a first given time slot, the master node is configured to operate using the first transmit mode and the first and second slave nodes are each configured to operate using the second receive mode or the sleep mode, and/or for a second given time slot, the master node is configured to operate using the first receive mode and the first and second slave nodes are both configured to operate using one of the second transmit mode, the second receive mode, or the sleep mode.

11. The system according to claim 1, wherein identities of the master node and the first and second slave nodes are known by each other.

12. The system according to claim 1, wherein identities of the master node and the first and second slave nodes are unknown by each other.

13. A method for performing secure key exchange between a plurality of nodes of a communication network, the plurality of nodes comprising at least a master node, a first slave node, and a second slave node, the method comprising:

broadcasting, by the master node, an ephemeral public key of the master node to the first and second slave nodes;

receiving, by the master node, an ephemeral public key of the first slave node, a digital signature of the first slave node, and a first message authentic code tag based on a first pair-wise authentication key computed by the first slave node;

receiving, by the master node, an ephemeral public key of the second slave node, a digital signature of the second slave node, and a second message authentic code tag computed using a second pair-wise authentication key computed by the second slave node;

computing, by the master node, the first pair-wise authentication key, and the second pair-wise authentication key;

verifying, by the master node, the first message authentication code tag is valid using the first pair-wise authentication key computed by the master node;

verifying, by the master node, the second message authentication code tag is valid using the second pair-wise authentication key computed at the master node, generating, by the master node, a group authentication key common to the plurality of nodes;

generating, by the master node, a digital signature for the first slave node on the ephemeral public key of the first slave node and the ephemeral public key of the master node using a long-term private key of the master node;

generating, by the master node, a digital signature for the second slave node on the ephemeral public key of the second slave node and the ephemeral public key of the master node using the long-term private key of the master node;

generating, by the master node, a first encrypted group authentication key by encrypting the group authentication key using the first pair-wise authentication key, and a third message authentication code tag by encrypting a long-term public key of the master node using the first pair-wise authentication key;

generating, by the master node, a second encrypted group authentication key by encrypting the group authentication key using the second pair-wise authentication key, and a fourth message authentication code tag by encrypting the long-term public key of the master node using the second pair-wise authentication key;

communicating, by the master node via a single transmission, the first encrypted group authentication key, the digital signature for the first slave node, and the third message authentication code tag to the first slave node, and the second encrypted group authentication key, the digital signature for the second slave node, and the fourth message authentication code tag to the second slave node;

verifying, by the first slave node, the digital signature of the first slave node and the third message authentication code tag are valid and decrypting the first encrypted group authentication key to obtain the group authentication key; and verifying, by the second slave node, the digital signature of the second slave node and the fourth message authentication code tag are valid and decrypting the second encrypted group authentication key to obtain the group authentication key.

14. The method according to claim 13, further comprising:

transmitting an ephemeral public key from the master node to the first and second slave nodes, wherein:

the first slave node computes the first pair-wise authentication key after receiving the ephemeral public key transmitted by the master node, and the second slave node computes the second pair-wise authentication key after receiving the ephemeral public key transmitted by the master node.

15. The method according to claim 14, further comprising:

computing and transmitting, by the first slave node to the master node, a first digital signature, and a first message authentication code using the first pair-wise authentication key computed at the first slave node;

computing and transmitting, by the second slave node to the master node, a second digital signature, and a second message authentication code using the second pair-wise authentication key computed at the second slave node;

verifying, at the master node the first digital signature is valid, and then computing the first pair-wise authentication key for the first slave node, and verifying the first message authentication code is valid using the first pair-wise authentication key for the first slave node computed at the master node; and verifying, at the master node the second digital signature is valid, and then computing the second pair-wise authentication key for the second slave node, and verifying the second message authentication code is valid using the second pair-wise authentication key for the second slave node computed at the master node.

16. The method according to claim 15, further comprising:

computing, at the first slave node, the first message authentication code on a long term public key corresponding to the first slave node and the first pair-wise authentication key computed at the first slave node; and computing, at the second slave node, the second message authentication code on a long term public key corresponding to the second slave node and the second pair-wise authentication key computed at the second slave node.

17. The method according to claim 14, further comprising:

decrypting, at the first slave node, the first encrypted group authentication key to obtain the group authentication key, and decrypting, at the second slave node, the second encrypted group authentication key to obtain the group authentication key.

18. The method according to claim 13, further comprising:

the master node, the first slave node and the second slave node synchronizing with one another.

19. The method according to claim 13, further comprising:

for a first given time slot, the master node operating using a first transmit mode and the first and second slave nodes operating using a second receive mode or a sleep mode, and/or for a second given time slot, the master node operating using a first receive mode and the first and second slave nodes both operating using one of a second transmit mode, the second receive mode, or the sleep mode.

20. The method according to claim 13, further comprising the master node and the first and second slave nodes learning identities of each other.

* * * * *